United States Patent
Gebhart et al.

(10) Patent No.: US 8,762,986 B2
(45) Date of Patent: Jun. 24, 2014

(54) ADVANCED PACKAGING AND DEPLOYMENT OF VIRTUAL APPLIANCES

(75) Inventors: Alexander Gebhart, Akazienweg (DE); Erol Bozak, Vinzentiusstrasse (DE)

(73) Assignee: SAP AG, Walldorf (DE)

( * ) Notice: Subject to any disclaimer, the term of this patent is extended or adjusted under 35 U.S.C. 154(b) by 1465 days.

(21) Appl. No.: 12/034,527

(22) Filed: Feb. 20, 2008

(65) Prior Publication Data
US 2009/0210869 A1 Aug. 20, 2009

(51) Int. Cl.
*G06F 9/445* (2006.01)
(52) U.S. Cl.
USPC .............................. 717/174; 717/175; 717/177
(58) Field of Classification Search
None
See application file for complete search history.

(56) References Cited

U.S. PATENT DOCUMENTS 6,681,391 B1 * 1/2004 Marino et al. ................ 717/175
7,356,679 B1 * 4/2008 Le et al. ........................ 717/176

* cited by examiner

*Primary Examiner* — Qamrun Nahar
(74) *Attorney, Agent, or Firm* — Mintz Levin Cohn Ferris Glovsky and Popeo, P.C.

(57) ABSTRACT

Methods and apparatus, including computer program products, are provided for deploying virtual appliances. In one aspect, there is provided a computer-implemented method. The method may include receiving information representative of one or more requirements of virtual appliances and one or more resources available to host the virtual appliances. A download manager may be used to install the virtual appliances. The installation may be configured based on the received information. The start of the virtual appliances may be initiated based on a dependency description. The dependency description includes a sequence for starting the virtual appliances including the network configuration. Related apparatus, systems, methods, and articles are also described.

18 Claims, 4 Drawing Sheets

ADVANCED PACKAGING AND DEPLOYMENT OF VIRTUAL APPLIANCES

FIELD

The present disclosure generally relates to virtual appliances.

BACKGROUND

Virtualization technology provides a mechanism for optimizing data processing. Virtualization technology provides a software layer that when executed allows multiple virtual machines with, in some cases, different operating systems to run side-by-side with other virtual machines running on the same physical machine (e.g., a host, a node, a computer, a processor, a server, and the like). The virtualization software provides a so-called "container" that wraps and isolates the virtual machine from other virtual machines. For example, in a server complex including fifty physical servers, each of which hosts its own application server, virtualization permits the server complex to instead operate with, for example, twenty-five physical servers, each of which includes virtualization software providing two virtual machines for the application servers. In both cases, fifty application servers are deployed, but with virtualization, the number of physical servers is reduced to twenty-five.

Virtualization software may also provide one or more of the following functions: running multiple virtual machines with different operating systems at the same time on the same physical machine; generating fully configured isolated virtual machines with a set of virtual hardware including an operating system and applications; saving, copying, and provisioning of virtual machines; networking, including Internet Protocol (IP) addresses, virtual IP addresses, and the like; and moving virtual machines from one physical machine to another physical machine for workload management.

When a virtual machine is used, the virtual machine may include an operating system and one or more applications. An operating system (OS) is the program that, after being initially loaded into a computer by a boot program, manages other programs on the computer. The other programs (also referred to as application programs or programs) may use the operating system by making requests for services through one or more application program interfaces (APIs) of the operating system. An application may perform one or more specific functions (or tasks) directly for a user or, in some cases, another program or application program. Examples of applications include spreadsheets, word processing, browsers, databases, and the like. For example, a virtual machine may include an operating system, such as Linux or Windows Vista, and one or more application programs, such as a browser, all of which operate in the so-called "container" provided by the virtual machine.

In some cases, the virtual machine may also include some data for use by the application. When this is the case, the virtual machine may be referred to as a virtual appliance. The phrase "virtual appliance" refers to an example of a virtual machine that may include an application, an operating system, and other items (e.g., data, drivers, IP addresses, etc.) to enable simplification of the installation and the configuration process associated with running the application. An example of a virtual appliance is the MediaWiki software that powers Wikipedia, which is available as a virtual appliance. The MediaWiki appliance contains all the necessary software, including operating system, database, and MediaWiki, to run a wiki installation as a so-called "black box."

SUMMARY

The subject matter disclosed herein provides methods and apparatus, including computer program products, for deploying virtual appliances.

In one aspect, there is provided a computer-implemented method. The method may include receiving information representative of one or more requirements of virtual appliances and one or more resources available to host the virtual appliances. A download manager may be used to install the virtual appliances. The installation may be configured based on the received information. The start of the virtual appliances may be initiated based on a dependency description. The dependency description includes a sequence for starting the virtual appliances. Related apparatus, systems, methods, and articles are also described.

Variations may include one or more of the following features. The virtual appliances may be stored as a system. The system includes components of a cluster, each of which is implemented as a virtual appliance selectable for installation. The components may be implemented as one or more of the following: a central instance, a dialog instance, and a database instance. The download manager may be received, when the virtual appliances are selected for installation.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
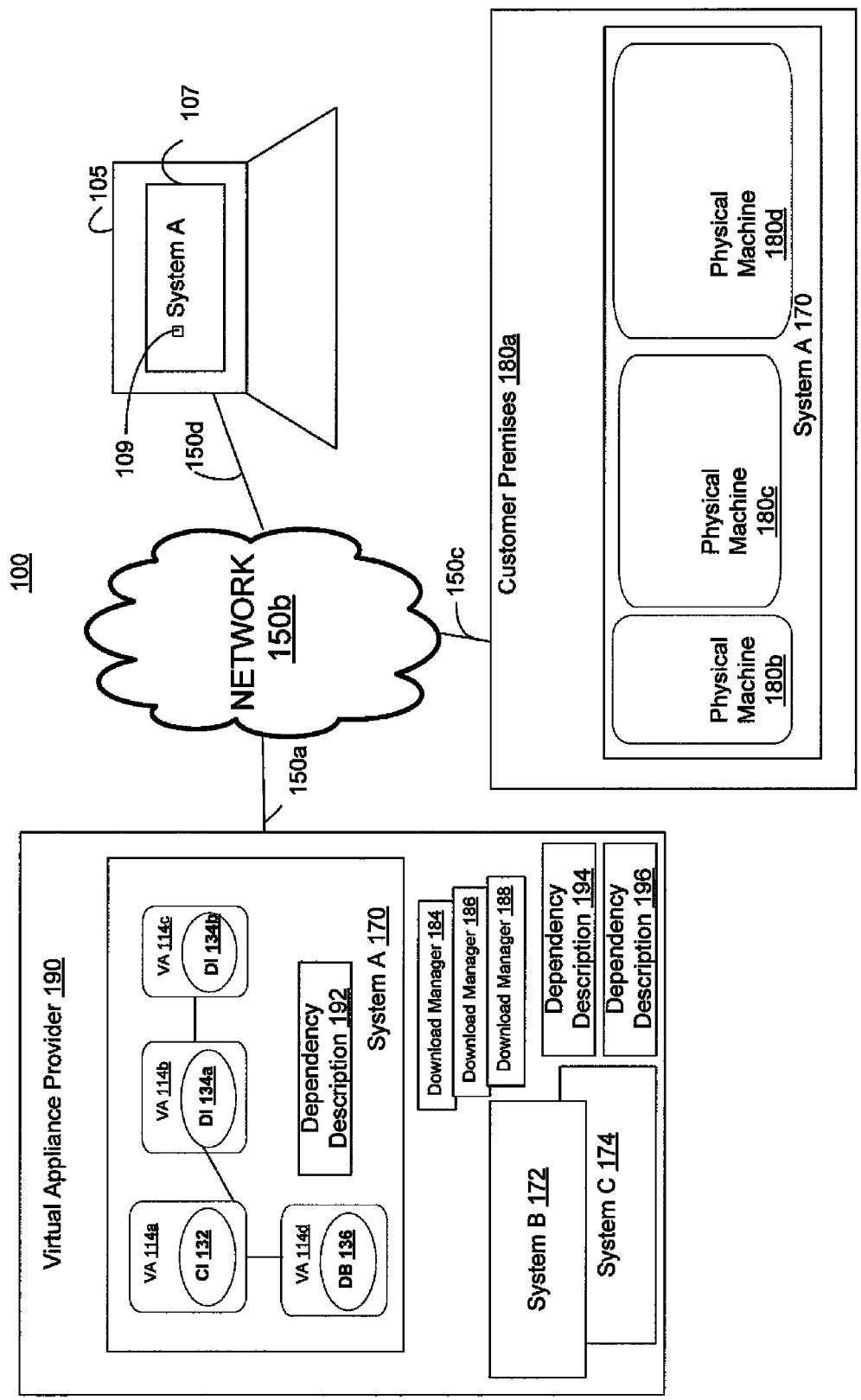
FIG. 1 depicts a block diagram 100 including a system 170 packaged for deployment.

Like labels are used to refer to same or similar items in the drawings.

DETAILED DESCRIPTION

Today, many programs are offered at a so-called "marketplace," where the program, included as part of a virtual appliance, may be readily downloaded and run on a computer with little or no configuration. Thus, a user may run applications without regard to installation and customization to a specific physical machine. However, a shortcoming of virtual appliances is that it is not possible with past approaches to package large systems comprising programs into a single, large virtual appliance. Moreover, even if such a virtual appliance could be packaged into one, large virtual appliance, running the single, virtual appliance on a single physical machine may not coincide with the resources available at the physical machine executing the virtual appliance. Indeed, large software-based systems typically require many physical machines. For example, enterprise software systems, such as Enterprise Resource Planning (ERP) applications, Customer Relationship Management (CRM) applications, and Supply Chain Management (SCM) applications, are complex systems that typically run in a cluster of physical machines, such as processors, computers, servers, blades, and the like. The subject matter described herein provides a mechanism for packaging and deploying software-based systems, including large, software-based systems (e.g., enterprise software systems) using virtual appliances.

FIG. 1 depicts a block diagram 100 including a virtual appliance provider 190 including one or more systems, such as system A 170, system B 172, and system C 174. These systems 170-174 may be available at a so-called marketplace, where the systems 170-174 are available for download (e.g., when selected by a user interface 107). Virtual appliance provider 190 may be coupled to a customer location 180a by a communication mechanism, such as network 150a-d (e.g., the Internet, an intranet, inter-process communication, or a combination of the aforementioned communication mechanisms). In some implementations, virtual appliance provider 190 is a marketplace (e.g., like Amazon.com) accessible on the Internet.

In some implementations, a user interface 107 at computer 105 is used to select an icon 109. The selection of icon 109 may result in a message being sent through network 150a-d to virtual appliance provider 190, so that a system (e.g., system A 170) comprising virtual appliances is selected for installation at a customer location 180a. System A 170 may be preconfigured and stored as virtual appliances at provider 190. A download manager 184 may be provided to the customer location 180a. The download manager 184 may receive information representative of requirements of the selected virtual appliances and the resources available to host the virtual appliances at the customer location 180a. The download manager may configure the installation based on the received information, which may include dependency description 194. At the customer location 180a, the start of the virtual appliances may be initiated based on dependency description 194. The dependency description 194 may include a sequence for starting the virtual appliances.

The virtual appliance provider 190 may be implemented as a website, such as a portal and include one or more physical machines accessible via a communication mechanism, such as network 150a-d. For example, virtual appliance provider 190 may be a marketplace on the Internet, where user interface 107 of computer 105 may be used to select one of the systems 170-174 for download to customer location 180a, where the downloaded system may be implemented as one or more virtual appliances.

System A 170 includes one or more components packaged for deployment. Specifically, the components include a central instance 132, dialog instances 134a-b, and database 136. Although FIG. 1 depicts central instance 132, dialog instances 134a-b, and database 136 packaged as four virtual appliances (labeled "VA") 114a-d, other packaging schemes may be used as well. For example, when all four cluster components 132, 134a-b, and 136 are packaged as a single virtual appliance, the packaging scheme is referred to as single packaging; two or more cluster components packaged together as one virtual appliance is referred to as combined packaging. The packaged virtual appliance may include other packaged virtual appliances (referred to as stacked packaging). For example, a stacked package may include a virtual appliance "A", which includes virtual appliances "B", "C" and "D." System B 172 and system C 174 may each be implemented, as described above with respect to system A 170, although other types of programs, applications, and the like may be used as well.

Central instance 132 may be implemented as an application server. In some implementations, central instance 132 manages the processes among system A 170 (e.g., when system A 170 is implemented as a cluster). A cluster refers to a plurality of physical hosts that work together to perform a specific task or function. Furthermore, central instance 132 may include a message server for communications, and include an associated system identifier (SID) identifying the cluster to a cluster manager and/or a cluster registry.

The dialog instances 134a-b may also be implemented as application servers. For example, a dialog instance may be configured on a cluster as an application server providing applications, such as a customer relationship management (CRM) application, an enterprise resource planning (ERP) application, a product lifecycle management application, a supply chain management (SCM) application, a supplier relationship management application, as well as any other application. When a client computer accesses an SCM application at the central instance, it is dispatched to any of the dialog instances and from then on, an instance of the SCM application runs on the host machine on which the dialog instance runs. If another client computer accesses the central instance, the SCM application may be served from a different dialog instance or from the same dialog instance. In this example, the dialog instance operates as an application server that wraps each instance of the SCM application, so that the two SCM applications can run independently regardless of whether they run on the same or different nodes within the cluster.

System 100 also depicts an instance of a database 136. In some implementations, central instance 132, dialog instances 134a-b, and database 136 are implemented as part of a cluster, although other implementations may be used as well. Moreover, central instance 132, dialog instances 134a-b, and database 136 are each implemented on virtual appliances 114a-d, respectively.

The cluster components 132, 134a-b, and 136 may have dependencies and other metadata describing the cluster components. For example, the database 136 may need to be started first, followed by the central instance 132, and the dialog instances 134a-b. These and other dependencies may be described and stored in a dependency description 192. In some implementations, dependency description 192 is implemented as an XML (eXtensible Markup Language) file, although other formats may be used as well.

Moreover, in some implementations, dependency description 192 includes information regarding a single system (e.g., system A 170) and its dependencies to other systems, such as systems 172-174. For example, in complex software systems spanning a plurality of clusters (e.g., a first cluster providing a CRM system, a second cluster providing a supply chain management (SCM) system, and a third cluster providing an ERP system), the dependencies between these clusters may also be also stored in dependency description 192. The dependency description 192 may include one or more of the following information: a location of a virtual appliance (e.g., location of virtual appliances 114a-d); sizing information (e.g. how a virtual machine needs to be sized in terms of quantity (or speed) of processors, amount of main memory, amount of network bandwidth, and amount of disk capacity); sizing templates for different types of installations, such as small, medium and large customers; a start sequence for component of the cluster; a start sequence for the landscapes including multiple systems, and sizing information for the system itself (e.g. how many work processes). Download managers 184-188 may each be implemented as a program that manages the download of systems 170-174. In some implementations, download manager 184 is downloaded to customer location 180a to manage the download of a system selected for implementation at customer location 180a. Alternatively, only a single download manager may be implemented that reads XML data describing the dependencies (e.g., receiving a dependencies file via an Internet download).

The customer location 180a may include one or more physical machines, such as physical machines 180b-d. Moreover, customer location 180a may be accessible via a communication mechanism, such as the network 150-a-d.

In some implementations, system A 170 is packaged as virtual appliances. For example, in the case of a single, large application program, like a CRM application or an ERP application, system A 170, packaged as one or more components of a cluster, may be implemented across a plurality of physical machines running on one or more virtual appliances 114a-d. Although customer location 180a is depicted as separate from virtual appliance provider 190, customer location 180a may be located anywhere and/or distributed across multiple locations.

Figure 2:
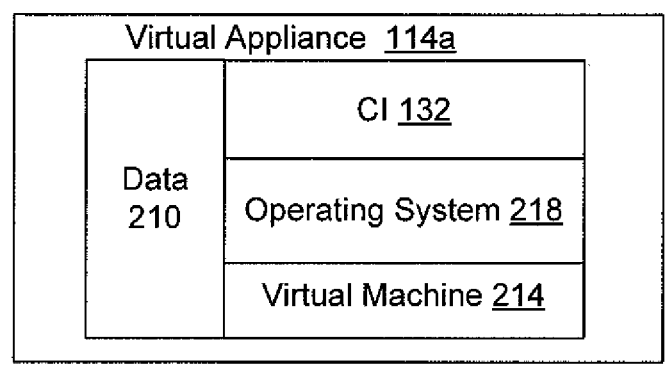
FIG. 2 depicts a block diagram of a virtual appliance.

FIG. 2 depicts an example implementation of virtualization technology. The virtual machine 214 may be implemented as software for creating a virtualized system between a physical machine and its operating system. The virtual appliance 114a may include virtual machine 214, an application, such as central instance 132, although any other application, application server, dialog instance, or database instance may be included as part of the virtual appliance. The virtual appliance 114a may also include an operating system 218, such as Microsoft Windows, Microsoft Vista, Java, Sun OS Linux, or any other operating system. The virtual appliance 114a may also include data 210 to configure or operate the application, virtual machine, or operating system. In some implementations, the virtual machine 214 may be implemented as a hypervisor (also referred to as a virtual machine controller or, more simply, a controller). The hypervisor may control (or manage) the physical machine's processor, memory, storage, network capacity, and other resources enabling the virtual operating environment. VMWare ESX and VMware Server are examples of hypervisor software for virtualizing an operating environment, including IP (Internet Protocol) addresses, registries, and other aspects normally used at a computer of a network.

Figure 3:
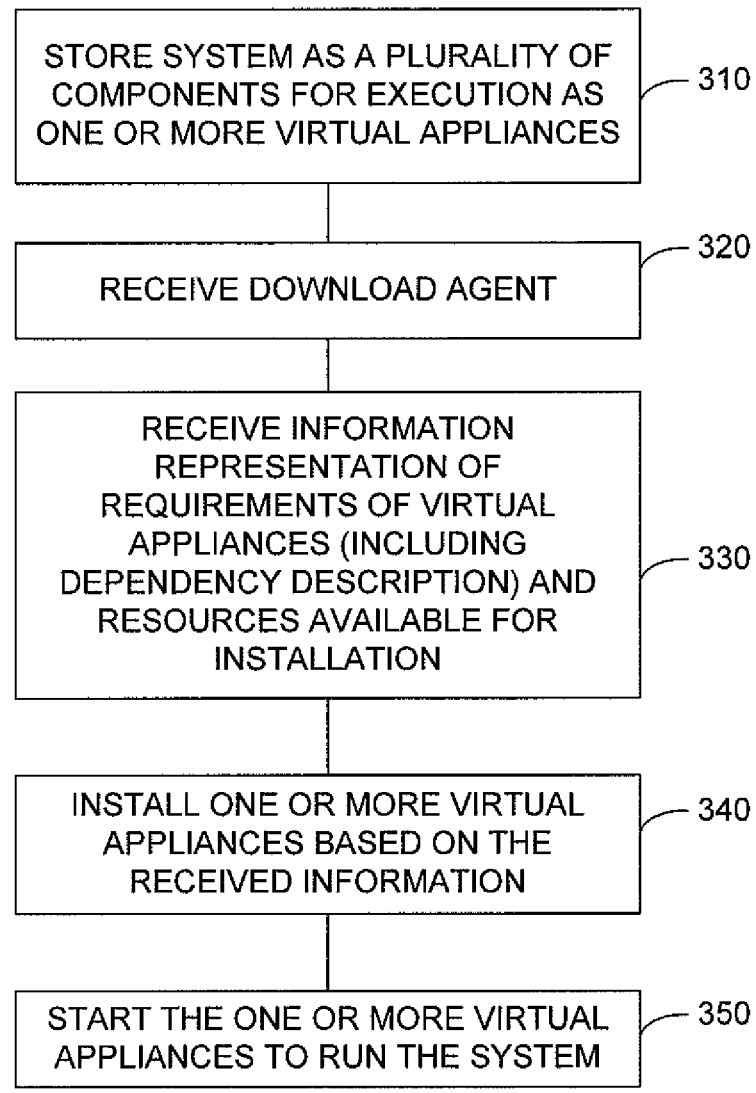
FIG. 3 depicts a process 300 for packaging and deploying the system 170 as virtual appliances.

FIG. 3 depicts a process 300 for deploying virtual appliances.

At 310, one or more components of a system, such as system A 170, may be stored as virtual appliances to enable execution at one or more physical machines. In some implementations, the system, such as system A 170, is divided into components of a cluster (referred to as cluster components). For example, each component of the cluster, such as applications servers, central instance 132, dialog instances 134a-b, and database instance 136 may be packaged as virtual appliances. Although the aforementioned example describes a single component in each virtual appliance, a plurality of components may be packaged in a virtual appliance as well. Moreover, the stored virtual appliances may be associated with a dependency description 192.

For example, in a CRM system including cluster components hosted across many physical machines, a cluster may include a central instance, many dialog instances, a database, and other applications and application servers. Each of these cluster components may be packaged as a single virtual appliance (single packaging), i.e., each component packaged as a separate virtual appliance. Alternatively, two or more cluster components may be packaged using combined packaging, e.g. two or more dialog instances might be packaged within a single virtual appliance. Moreover, a packaged virtual appliance may also include other packaged virtual appliances (described above as stacked packaging).

Moreover, any dependencies between components of the cluster (i.e., cluster components) may be included in dependency description 192. For example, a start sequence described in dependency description 192 may require database 136 to be started first, then central instance 132, and lastly dialog instances 134a-b as well as any other remaining applications associated with system A 170. When a plurality of clusters (e.g., the plurality of cluster forming a landscape, such as a CRM cluster, an ERP cluster, an SCM cluster, etc.) are involved the dependency description 192 may also include information describing the interrelationships between these clusters, such as the start sequence for the clusters (e.g., start a CRM cluster first, then an ERP cluster, and lastly the SCM cluster).

At 320, download manager 184 may be sent from virtual appliance provider 190 to customer location 180a. For example, when system A 170 is selected at user interface 107 (e.g., by selecting icon 109), customer location 180a may receive the download manager 184 sent by virtual appliance provider 190. To receive download manager 184, customer location 180a may receive the download manager 184 directly or download manager 184 may be provided via a link, from which customer location 180a may download and install download manager 184.

In some implementations, download manager 184 is specifically configured to install system A 170, while other download managers 186-188 would be specifically configured for each of systems B and C 172-174, respectively. When download manager 184 is specifically configured for a system, such as system A 170, download manager 184, when executed at customer location 180a, is able to automatically begin installation only of system A 170 using for example dependency description 192.

At 330, download manager 184 may receive information representative of at least one of the following: requirements of the virtual appliances 114a and resources available for installation at the customer location 180a. In some implementations, download manager 184 receives from dependency description 192 information representative of requirements of the virtual appliances being installed at customer location 180a (e.g., requirements of virtual appliances 114a-d). The information representative of the resources available at the customer location 180a may be obtained by receiving such information from the user, another program, or by scanning customer location 180a.

In some implementations, download manager 184 may prompt a user at user interface 107 to provide additional information, such as size of the company associated with customer location 180a (e.g., small, medium, large enterprises). Based on this size information, download manager 184 may use a template to enable configuration and sizing of system A 170 at customer location 180a. For example, a small company installation would utilize fewer physical resources at customer location 180a, when compared to a medium or large enterprise installation. Moreover, sizing of system A 170 may be done by scale-up, i.e., by adjusting one or more parameters of the virtual appliances (e.g., memory size, processing capacity, storage capacity, network bandwidth, and the like) after the virtual appliances are installed at customer location 180a. Alternatively, sizing of system A 170 may be done by scale-out (i.e., adding additional dialog instances to a cluster). Whether scale-up or scale-out is used may be based on the available physical machines at customer location 180*a* (e.g. a few large machines or many low-cost machines).

Download manager 184 may also receive information from dependency description 192. The information may include the start sequence for the virtual machines, required resources for the virtual machines (e.g., processing power, main memory, network speed, and storage capacity, such as disk space).

Download manager 184 may also receive information regarding the resources available at customer location 180*a* by allowing a user at user interface 107 to provide such information (e.g., entering IP addresses of available physical machines, location of mount points to network attached storage, etc.). Download manager 184 may also receive information regarding the resources available at customer location 180*a* by automatically retrieving information from a resource management system or by running a scan of local resources (e.g. a port scanner) at customer location 180*a*. In some cases, download manager 184 may allow a user at user interface 107 to select which available resources should be used at customer location 180*a*. Download manager 184 may also receive information regarding the network topology (e.g., IP addresses, subnet mask, default gateway, and addressing type, such as dynamic host configuration protocol) of system A 170 and network 150*a-d*. For example, download manager 184 may receive the network topology information from dependency description 192, from user interface 107, or automatically detect the network topology (e.g., by performing a scan for available network resources). When user interface 107 provides an indication that a virtual network is also present at system A 170, download manager 184 may also receive virtual IP addresses for one or more components of system A 170.

At 340, download manager 184 has all the relevant information to download system A 170. For example, download manager 185 has information representative of which system to install, how many virtual appliances are needed to run the system, dependencies among the virtual appliances, and required and available resources (e.g., processing power, network topology, network bandwidth, disk capacity, and main memory). If the appropriate resources are available at customer location 180*a*, download manager 184 may initiate the start of downloading (e.g., install) the system, such as system A 170, to customer location 180*a*. If the appropriate resources are not available at customer location 180*a*, download manager 184 may send a message to user interface 107 indicating that additional resources are required at customer location 180*a* before the install may take place.

In some implementations, before a user downloads a system via the download manager, the user may specify either a specific or a unique SID (System ID) instead of using a predefined SID. To that end, the user may provide their own SID to the download manager. The download manager then does not perform a mere download. Instead, the user initiates a system copy (i.e., a so-called "clone") first, so that an existing system template is copied and then the template is re-configured to use the specified SID. Once the new SID(s) are in place, the system is downloaded to the customer. Moreover, the template may be copied to one or many systems.

At 350, download manager 184 may start the installed virtual appliances. Since download manager 184 knows all the dependency information (e.g., startup sequence of virtual appliances), download manager 184 is able to start the various virtual appliances in the correct order. In the case of a stacked packaging mentioned above, download manager 184 is able to migrate the stacked appliances to the appropriate resources.

After startup, download manager 184 may, for each application, use a small test program to verify the proper operation. The test program may either be downloaded or run independently or the test program might be part of the application itself (e.g., download manager 184 may call the test functionality via an application interface).

Figure 4:
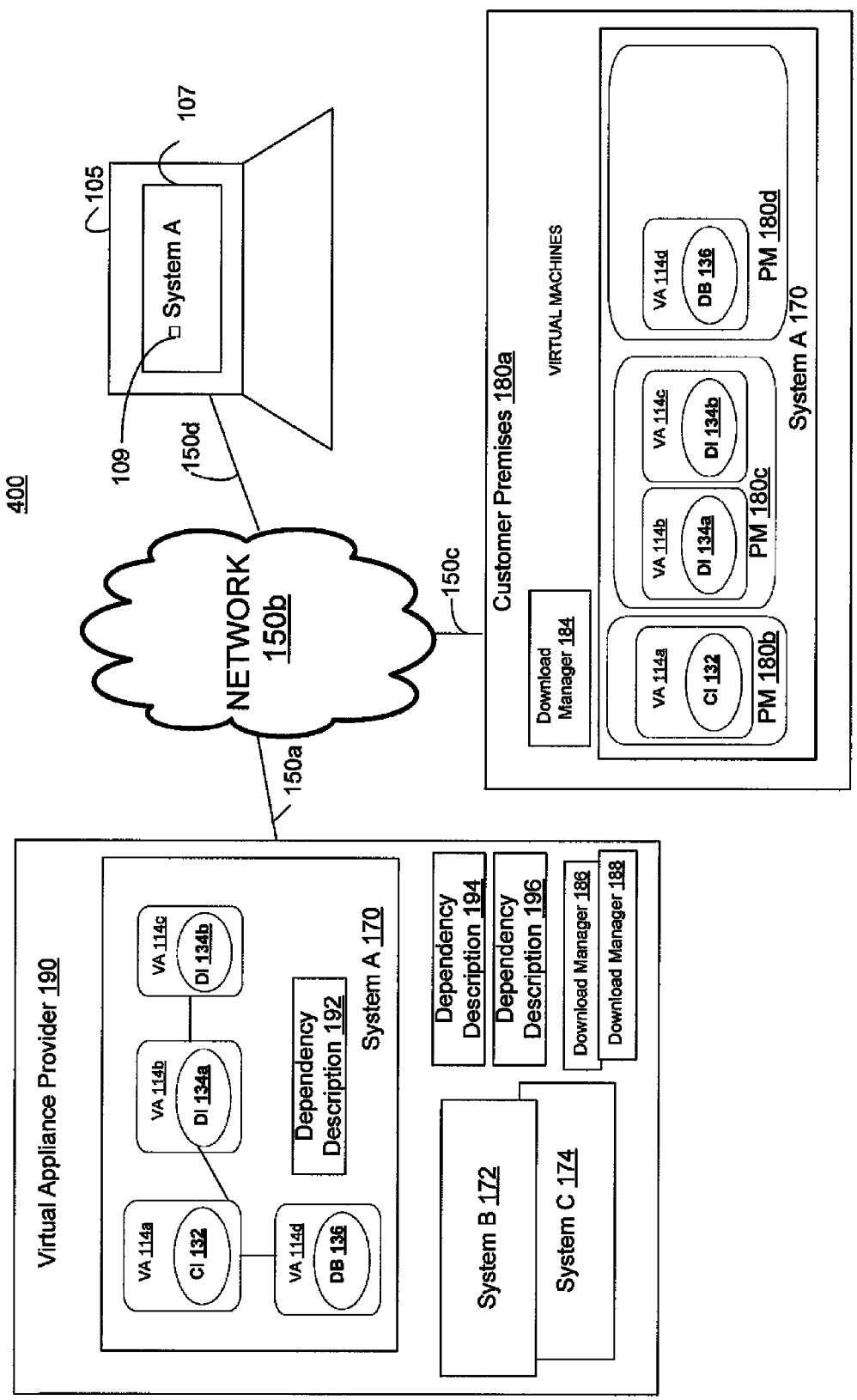
FIG. 4 depicts FIG. 1 after the virtual appliances have been deployed according to the process 300.

FIG. 4 depicts FIG. 1 after system A 170 has been packaged and deployed on customer location 180*a*. Customer location 180*a* includes download manager 184, which managed the download to customer location 180*a*, using dependency description 192. Moreover, system A 170 is installed as virtual machines 114*a-d* on physical machines 180*b-d*. Although customer premise 180*a* depicts three physical machines, more or fewer machines may be used as well. In some implementations, the use of dependency description 192 and download manager 184 simplifies the configuration of virtual appliances including large, software-based systems, such as ERP applications, CRM applications, and SCM applications.

The subject matter described herein may be used to copy many systems (e.g., entire landscapes or part of landscapes) from one location to another, so that it may facilitate the establishment of a datacenter.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Moreover, although the subject matter described above was described with respect to virtual appliances, the virtual appliances may be implemented using virtual machines as well The foregoing description is intended to illustrate but not to limit the scope of the invention, which is defined by the scope of the appended claims. Other embodiments are within the scope of the following claims.

What is claimed is:

1. A computer-implemented method comprising:
receiving information representative of one or more requirements of virtual appliances and one or more resources available to host the virtual appliances;
installing, using a download manager, the virtual appliances, the installation configured based on the received information and at least one template, the at least one template defining installation configurations for the virtual appliances and sizing information for the virtual appliances, the installation configurations representative of a small, a medium, and a large enterprise, the sizing information being based on the one or more resources and including at least one of the following: at least one parameter for adjusting the virtual appliances subsequent to installation of the virtual appliances, and at least one dialog instance for adding to the virtual appliances; and
initiating a start of the virtual appliances based on a dependency description, the dependency description comprising a sequence for starting the virtual appliances and the at least one template, wherein the sequence for starting the virtual appliances is based on at least one dependency between at least one virtual appliance and at least another virtual appliance.

2. The computer-implemented method of claim 1 further comprising:
storing the virtual appliances as a system, the system comprising one or more components of a cluster, the one or more components implemented as a virtual appliance, the virtual appliances selectable for installation.

3. The computer-implemented method of claim 2 further comprising:
defining each component as one or more of the following: a central instance, a dialog instance, a database instance, and a search engine.

4. The computer-implemented method of claim 1 further comprising:
receiving the download manager, when the virtual appliances are selected for installation.

5. The computer-implemented method of claim 1, wherein receiving further comprises:
including in the one or more requirements of virtual appliances the following: a processing speed required by at least one of the virtual appliances; a memory capacity required by at least one of the virtual appliances; a storage capacity required by at least one of the virtual appliances; and a network bandwidth required by at least one of the virtual appliances.

6. The computer-implemented method of claim 1, wherein receiving further comprises:
including in the resources available an indication of a quantity of physical machines available to be used to host the virtual appliances.

7. A non-transitory computer-readable medium storage containing instructions to configure a processor to perform a method, the method comprising:
receiving information representative of one or more requirements of virtual appliances and one or more resources available to host the virtual appliances;
installing, using a download manager, the virtual appliances, the installation configured based on the received information and at least one template, the at least one template defining installation configurations for the virtual appliances and sizing information for the virtual appliances, the installation configurations representative of a small, a medium, and a large enterprise, the sizing information being based on the one or more resources and including at least one of the following: at least one parameter for adjusting the virtual appliances subsequent to installation of the virtual appliances, and at least one dialog instance for adding to the virtual appliances; and
initiating a start of the virtual appliances based on a dependency description, the dependency description comprising a sequence for starting the virtual appliances and the at least one template, wherein the sequence for starting the virtual appliances is based on at least one dependency between at least one virtual appliance and at least another virtual appliance.

8. The computer-readable storage medium of claim 7 further comprising:
storing the virtual appliances as a system, the system comprising one or more components of a cluster, the one or more components implemented as a virtual appliance, the virtual appliances selectable for installation.

9. The computer-readable storage medium of claim 8 further comprising:
defining each component as one or more of the following: a central instance, a dialog instance, and a database instance, and a search engine.

10. The computer-readable storage medium of claim 7 further comprising:
receiving the download manager, when the virtual appliances are selected for installation.

11. The computer-readable storage medium of claim 7, wherein receiving further comprises:
including in the one or more requirements of virtual appliances the following: a processing speed required by at least one of the virtual appliances; a memory capacity required by at least one of the virtual appliances; a storage capacity required by at least one of the virtual appliances; and a network bandwidth required by at least one of the virtual appliances.

12. The computer-readable storage medium of claim 7, wherein receiving further comprises:
including in the resources available an indication of a quantity of physical machines available to be used to host the virtual appliances.

13. A system comprising:
a processor; and
a memory, wherein the processor and the memory are configured to perform a method comprising:
receiving information representative of one or more requirements of virtual appliances and one or more resources available to host the virtual appliances;
installing, using a download manager, the virtual appliances, the installation configured based on the received information and at least one template, the at least one template defining installation configurations for the virtual appliances and sizing information for the virtual appliances, the installation configurations representative of a small, a medium, and a large enterprise, the sizing information being based on the one or more resources and including at least one of the following: at least one parameter for adjusting the virtual appliances subsequent to installation of the virtual appliances, and at least one dialog instance for adding to the virtual appliances; and
initiating a start of the virtual appliances based on a dependency description, the dependency description comprising a sequence for starting the virtual appliances and the at least one template, wherein the sequence for starting the virtual appliances is based on at least one dependency between at least one virtual appliance and at least another virtual appliance.

14. The system of claim 13 further comprising:
storing the virtual appliances as a system, the system comprising one or more components of a cluster, the one or more components implemented as a virtual appliance, the virtual appliances selectable for installation.

15. The system of claim 14 further comprising:
defining each component as one or more of the following: a central instance, a dialog instance, and a database instance, and a search engine.

16. The system of claim 13 further comprising:
receiving the download manager, when the virtual appliances are selected for installation.

17. The system of claim 13, wherein receiving further comprises:
including in the one or more requirements of virtual appliances the following: a processing speed required by at least one of the virtual appliances; a memory capacity required by at least one of the virtual appliances; a storage capacity required by at least one of the virtual appliances; and a network bandwidth required by at least one of the virtual appliances.

18. The system of claim 13, wherein receiving further comprises:
including in the resources available an indication of a quantity of physical machines available to be used to host the virtual appliances.

* * * * *